(12) United States Patent
Rhee et al.

(10) Patent No.: US 12,250,946 B2
(45) Date of Patent: Mar. 18, 2025

(54) ANTIFUNGAL COMPOSITION HAVING EXCELLENT ANTIFUNGAL ACTIVITY EVEN AT LOW TEMPERATURE

(71) Applicant: Korea University Research and Business Foundation, Seoul (KR)

(72) Inventors: Min Suk Rhee, Seongnam-si (KR); Byung Soo Ko, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 24 days.

(21) Appl. No.: 17/505,902

(22) Filed: Oct. 20, 2021

(65) Prior Publication Data

US 2022/0117225 A1    Apr. 21, 2022

(30) Foreign Application Priority Data

Oct. 20, 2020  (KR) .......... 10-2020-0136165
Sep. 28, 2021  (KR) .......... 10-2021-0127796

(51) Int. Cl.
*A01N 37/02*    (2006.01)
*A01N 31/02*    (2006.01)
*A01N 31/08*    (2006.01)
*A01N 25/02*    (2006.01)

(52) U.S. Cl.
CPC ............ *A01N 37/02* (2013.01); *A01N 31/02* (2013.01); *A01N 31/08* (2013.01); *A01N 25/02* (2013.01)

(58) Field of Classification Search
CPC ........ A01N 37/02; A01N 31/02; A01N 31/08; A01N 25/02; A01P 3/00
See application file for complete search history.

(56) References Cited

U.S. PATENT DOCUMENTS

2015/0230458 A1*  8/2015  Winters ................ A01N 31/08
                                                514/558

FOREIGN PATENT DOCUMENTS

| KR | 10-2001-0014232 A | 2/2001 |
| KR | 10-2004-0033286 A | 4/2004 |
| KR | 10-2011-0040936 A | 4/2011 |
| KR | 10-2018-0071348 A | 6/2018 |
| KR | 10-1952715 B1 | 2/2019 |
| KR | 10-2237517 B1 | 4/2021 |

OTHER PUBLICATIONS

De Spiegeleer et al. Pharm Dev Tech. 2006; 11: 275-284. (Year: 2006).*
Ko, Byung Soo., "Trace amounts of generally recognized as safe penetration enhancer and natural antimicrobials effectively eradicate biofilm embedded *Candida albicans* at low and ambient temperatures", Thesis for the Degree of Master, Korea University, Aug. 2020 (pp. 1-111).
Korean Office Action issued on Dec. 13, 2023, in counterpart Korean Patent Application No. 10-2021-0127796 (1 pages in English, 2 pages in Korean).

* cited by examiner

*Primary Examiner* — David Browe
(74) *Attorney, Agent, or Firm* — NSIP Law

(57) ABSTRACT

The present disclosure relates to an antifungal composition including propylene glycol, caprylic acid, and carvacrol as active ingredients.

2 Claims, 8 Drawing Sheets

ANTIFUNGAL COMPOSITION HAVING EXCELLENT ANTIFUNGAL ACTIVITY EVEN AT LOW TEMPERATURE

CROSS-REFERENCE TO RELATED APPLICATIONS

This application claims the benefit under 35 USC § 119(a) of Korean Patent Application Number 10-2020-0136165 filed on Oct. 20, 2020, and Korean Patent Application Number 10-2021-0127796 filed on Sep. 28, 2021, in the Korean Intellectual Property Office, the entire disclosures of which are incorporated herein by reference for all purposes.

TECHNICAL FIELD

The present disclosure relates to a novel antifungal composition comprising propylene glycol, caprylic acid, and carvacrol as active ingredients and having excellent antifungal activity even at a low temperature.

BACKGROUND ART

Mycosis is a disease caused by fungi that parasitize a human body, for example, about 40 types of fungi, such as *Candida* spp., *Actinomyces, Aspergillus, Cryptococcus, Mucor, Nocardia*, and the like.

Most of the mycoses invade the human body from the surrounding environment and cause diseases, but *Candida* and *Actinomyces* reside in the mouth or other mucous membranes of healthy people, and, when any inducement occurs, exhibit pathogenicity and cause mycoses. These mycoses vary in symptoms from mild to severe and may cause serious problems in the elderly and immunocompromised patients. Healthy adults have strong immunity to mycoses, but those with weak or weakened immunity, such as children and the elderly, HIV-infected patients, transplant surgery patients, patients receiving chemotherapy drugs, and patients using long-term immunosuppressants, are vulnerable to mycosis.

Among various fungi, *Candida albicans* mainly reproduces in epithelial cells in the human body. *Candida albicans* exists in normal skin, mucous membranes, feces, sputum, urine, etc. and is harmless to the human body, but, when antibiotics or adrenocortical hormones are used or when the body's immunity is weakened, induces abnormal growth and causes disease. It may also cause local mucositis, such as stomatitis and vaginitis, or progress to systemic infections. Types of candidiasis caused by *Candida albicans* include mucosal candidiasis in which oral cavity, tongue, vulva, and vagina are sore and painful; skin candidiasis in which skin folds, between fingers, near the anus, or breast becomes red; gastrointestinal candidiasis causing diarrhea, abdominal pain, jaundice, etc.; and systemic candidiasis with sepsis-like symptoms and meningitis or endocarditis.

On the other hand, microorganisms harmful to the human body, including *Candida albicans*, form biofilms and have resistance to a stressful environment such as a low temperature or a cold environment. A biofilm refers to an aggregate of bacteria or fungi, is formed like a thin film, and is produced by bacteria or fungi, which in turn can provide habitat for bacteria or fungi and is responsible for accelerating bacterial or fungal growth.

However, biofilms formed by various harmful microorganisms including *Candida albicans* are often found on the surface of food metals or in the manufacturing process of pharmaceuticals even at a refrigeration temperature. These fungal biofilms are difficult to remove from the surface except by certain antifungal methods.

Currently, antifungal agents are used as a means for inhibiting the growth of these fungi and removing biofilms, and various kinds of antifungal agents such as azole-based, polyene-based and allyamines-based antifungal agents have been developed and used. However, these antifungal agents have a problem of showing various kinds of side effects including hepatotoxicity. Particularly in the case of the most commonly used azole-based agents, the side effect of rapidly increasing resistance is shown. In addition, antifungal agents developed so far have a problem in that antibiotics do not effectively penetrate to the inside of the biofilms, so that harmful fungi cannot be completely removed.

Therefore, there is a need for the development of a new antifungal agent using a natural substance having excellent antifungal activity and biofilm inhibitory activity, few side effects, and less toxicity.

DETAILED DESCRIPTION OF THE INVENTION

Technical Problem

Accordingly, while the present inventors have been researching to develop a new antifungal agent with excellent antifungal activity and biofilm inhibitory activity, they have found that the composition comprising propylene glycol, caprylic acid, and carvacrol has excellent antifungal activity at a low temperature and a room temperature and has excellent biofilm inhibitory effect, and thus eventually completed the present disclosure.

Accordingly, an object of the present disclosure is to provide an antifungal composition comprising propylene glycol, caprylic acid, and carvacrol as active ingredients.

Another object of the present disclosure is to provide a composition for inhibiting or removing biofilm formation, comprising propylene glycol, caprylic acid, and carvacrol as active ingredients.

Another object of the present disclosure is to provide a method of inhibiting fungi, including treating the fungi with the antifungal composition of the present disclosure.

Technical Solution

Accordingly, the present disclosure provides an antifungal composition comprising propylene glycol, caprylic acid, and carvacrol as active ingredients.

In one embodiment of the present disclosure, the composition may have antifungal activity at room temperature and low temperature of 0 to 5° C.

In one embodiment of the present disclosure, the composition may have antifungal activity against *Candida* species.

In one embodiment of the present disclosure, the *Candida* species may be selected from the group consisting of *Candida albicans, Candida tropicalis, Candida glabrata, Candida krusei*, and *Candida paraphyllosis*.

In one embodiment of the present disclosure, the propylene glycol, caprylic acid, and carvacrol may be contained in the composition at a concentration of 0.5 to 1.5 mM, respectively.

Further, the present disclosure provides a composition for inhibiting or removing biofilm formation, comprising propylene glycol, caprylic acid, and carvacrol as active ingredients.

In one embodiment of the present disclosure, the propylene glycol, caprylic acid, and carvacrol may be contained in the composition at a concentration of 0.5 to 1.5 mM, respectively.

In one embodiment of the present disclosure, the biofilm may be a biofilm formed by *Candida* species.

In one embodiment of the present disclosure, the *Candida* species may be selected from the group consisting of *Candida albicans, Candida tropicalis, Candida glabrata, Candida krusei,* and *Candida paraphyllosis*.

Further, the present disclosure provides a method of inhibiting fungi, including treating the fungi with the antifungal composition of the present disclosure.

In one embodiment of the present disclosure, the fungi may be *Candida* species.

In one embodiment of the present disclosure, the *Candida* species may be selected from the group consisting of *Candida albicans, Candida tropicalis, Candida glabrata, Candida krusei,* and *Candida paraphyllosis*.

In one embodiment of the present disclosure, the treatment may be carried out at a room temperature and a low temperature of 0 to 5° C.

Advantageous Effects

The antifungal composition including propylene glycol, caprylic acid, and carvacrol according to the present disclosure has an effect of having a high antifungal activity against fungi within 5 minutes not only at a room temperature but also at a low temperature of 5° C., and inhibiting or removing the formation of biofilm as well. Therefore, the antifungal composition including propylene glycol, caprylic acid, and carvacrol according to the present disclosure can be effectively used as a new antifungal agent against harmful fungi including *Candida albicans*.

BRIEF DESCRIPTION OF THE DRAWINGS

FIGS. 4A to 4F show the results performed at a low temperature (5° C.), and FIGS. 5A to 5F show the results performed at a room temperature (22° C.), wherein 4A and 5A are groups untreated, 4B and 5B are groups treated with propylene glycol (1.2 mM) alone, 4C and 5C are groups treated with propylene glycol (1.2 mM) and caprylic acid (1.2 mM), 4D and 5D are groups treated with propylene glycol (1.2 mM) and carvacrol (1.2 mM), 4E and 5E are groups treated with caprylic acid (1.2 mM) and carvacrol (1.2 mM), and 4F and 5F are groups treated with propylene glycol (1.2 mM), caprylic acid (1.2 mM) and carvacrol (1.2 mM).

DETAILED DESCRIPTION OF THE EMBODIMENTS

Figure 1:
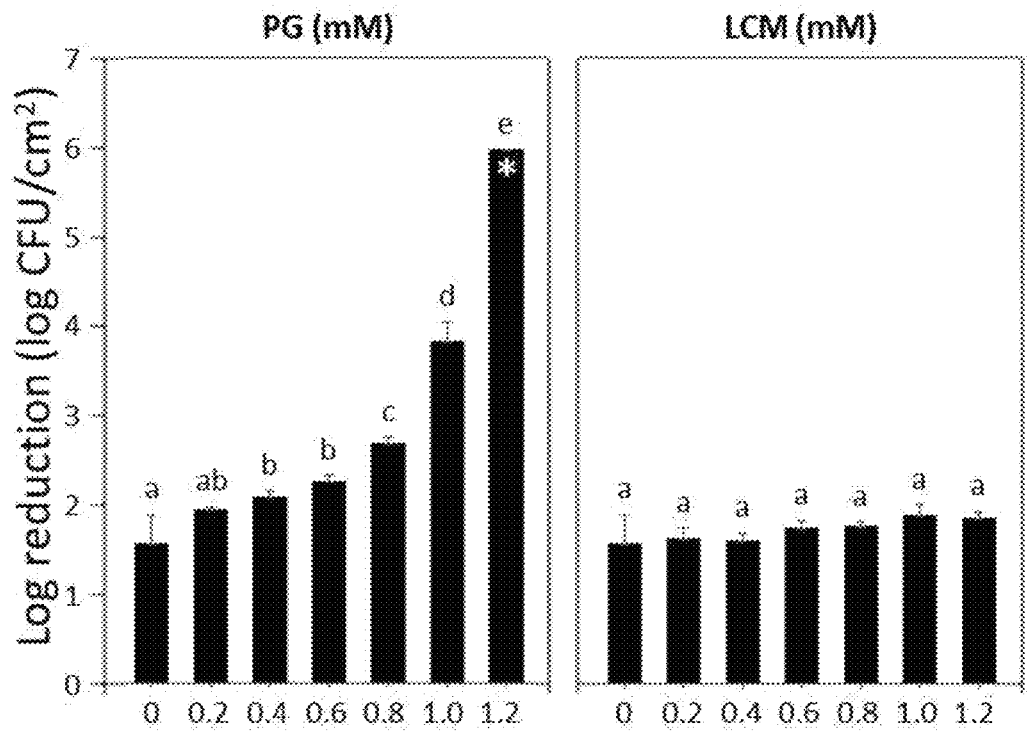
FIG. 1 shows an analysis of antifungal activity according to the type of penetration enhancer, wherein, to the composition comprising caprylic acid (1.2 mM) and carvacrol (1.2 mM), propylene glycol (PG) or laurocapram (LCM) as a penetration enhancer was added by concentration and assayed inhibitory activity against *Candida albicans* biofilm.

The present disclosure provides an antifungal composition having excellent antifungal activity even at a low temperature. Specifically, the present disclosure provides an antifungal composition including propylene glycol, caprylic acid, and carvacrol as active ingredients.

The propylene glycol is a liquid substance used as a skin penetration enhancer, and should be heated or vigorously shaken as a transparent, colorless, odorless, tasteless liquid at a room temperature, but may exist in the form of a vapor in the air. In addition, the propylene glycol is classified as a 'Generally Recognized as Safe (GRAS)' and is used in the food, pharmaceutical, and chemical industries. In fact, it is a relatively safe substance as it is known to be decomposed in the body in about 48 hours when humans breathe air containing vapors of propylene glycol, eat products containing propylene glycol, or come into direct contact with the skin.

Further, among medium-chain fatty acids, caprylic acid is a medium-chain fatty acid composed of 10 carbons ($CH_3(CH_2)_8COOH$) and is found in coconut oil, seed oil, and breast milk of mammals. The caprylic acid has a good flavor and is used as a cosmetic and food additive (flavoring agent) such as perfume, and is added to pharmaceuticals as lipid particles to increase drug delivery efficiency.

Further, carvacrol is one of the essential oils known to have antioxidant effects, and it may have nutritional and therapeutic potential. In general, many essential oils are listed on the 'Generally Recognized as Safe (GRAS),' making them safer than synthetic compounds and favored by consumers.

While the present inventors have been researching to develop a new antifungal agent using a natural substance that has excellent antifungal activity and biofilm inhibitory activity, few side effects, and less toxicity, we have confirmed that a composition comprising propylene glycol, caprylic acid, and carvacrol as an active ingredient has significantly superior antifungal activity compared to cases in which the above ingredients are used alone or in a combination of the two.

In addition, it was confirmed that the composition comprising propylene glycol, caprylic acid, and carvacrol as active ingredients has excellent antifungal activity not only at a room temperature but also at a low temperature of 0 to 5° C.

In the case of harmful fungi and bacteria, they maintain activity even at low temperatures such as refrigeration temperatures and continue to survive, and pathogenic fungal biofilms have resistance to stressful conditions such as cold environments. In particular, fungal biofilms including *Candida* species can be formed and grown in the manufacturing process of foods or drugs exposed to low temperatures, so it is necessary to develop antifungal agents with excellent antifungal activity even at low temperatures.

On the other hand, in one embodiment of the present disclosure, in order to confirm that the composition comprising all of propylene glycol, caprylic acid, and carvacrol as active ingredients has antifungal activity at low temperatures, the inventive composition was applied to a biofilm of *Candida albicans* at a room temperature and a low temperature (5° C.) for 5 minutes, and then the antifungal activity was analyzed, which showed that the composition comprising all three components had the best antifungal activity, and had the antifungal activity against *Candida albicans* in a very short time.

In addition, in one embodiment of the present disclosure, different penetration enhancers of propylene glycol and laurocapram as a penetration enhancer were treated with caprylic acid and carvacrol together with *Candida albicans* and the antifungal activity was analyzed, and as a result, the group treated with propylene glycol, an FDA-approved penetration enhancer, completely killed *Candida albicans* biofilm within 5 minutes compared to the group treated with laurocapram.

Therefore, the present inventors found that it is important to select and use propylene glycol as a component for maximizing the effect of antifungal activity.

In addition, in another embodiment of the present disclosure, it was confirmed by confocal microscopy whether the antifungal composition of the present disclosure comprising all of propylene glycol, caprylic acid, and carvacrol as active ingredients had the activity of inhibiting the biofilm. That is, when the inventive composition was treated on a biofilm of *Candida albicans* formed on a stainless steel surface, significant membrane damage in the biofilm formed and cell separation of *Candida albicans* were observed. In addition, it was confirmed that this anti-biofilm activity was achieved within 5 minutes at room temperature and low temperature conditions.

Accordingly, the present disclosure can provide an antifungal composition comprising propylene glycol, caprylic acid, and carvacrol as active ingredients.

The composition according to the present disclosure has antifungal activity within a very short time at a room temperature and at a low temperature of 0 to 5° C. In one embodiment of the present disclosure, it was confirmed that the inventive composition exhibited antifungal activity against *Candida albicans* in 5 minutes at a low temperature of 5° C., and inhibited the biofilm formation of *Candida albicans*.

In addition, the composition of the present disclosure may have antifungal activity against harmful fungi, and the fungi may preferably be *Candida* species.

The *Candida* species may include, but is not limited to, *Candida albicans, Candida tropicalis, Candida glabrata, Candida krusei*, and *Candida paraphyllosis*.

The propylene glycol, caprylic acid, and carvacrol contained in the present composition may be contained in the composition at a concentration of 0.5 to 1.5 mM, respectively.

If each component of propylene glycol, caprylic acid, or carvacrol is included at a concentration of less than 0.5 mM, the antifungal activity is not sufficient, whereas when it exceeds 1.5 mM, the antifungal activity does not continuously increase depending on the treatment concentration, which is uneconomical.

Preferably, the propylene glycol, caprylic acid, and carvacrol may be contained in the composition at a concentration of 1.2 mM, respectively.

Further, the present disclosure can provide a composition for inhibiting or removing biofilm formation, comprising propylene glycol, caprylic acid, and carvacrol as active ingredients.

As used herein, the term "biofilm" is a complex composed of a bacterial or a fungal colony that is a solid biological surface and an outer membrane that is a non-biological surface. In addition, the biofilm exhibits resistance to various environmental stresses, including antibiotics, and contributes to bacterial or fungal resistance to chronic infection. Cells forming biofilms are at least 1000 times more resistant to antibiotics than floating cells, and biofilm formation plays an important role in the pathogenesis of various diseases.

Although the cause of the increase in resistance to antibiotics due to the formation of biofilms is not yet known precisely, the formation of a biofilm lowers the dependence on the exchange action with the surrounding environment, and the outer membrane composed of mucopolysaccharides prevents the delivery of antibiotics to individual bacteria or fungi, and when a biofilm is formed, bacteria or fungi without resistance existing in the biofilm may also acquire resistance factor-related genes from surrounding resistant microorganisms through horizontal gene transfer. Therefore, when a biofilm is formed, it may be considered that it has become an antibiotic resistance state, and the action of an antibiotic widely used for the treatment of infection becomes difficult, resulting in a problem that the therapeutic effect of the antibiotic is weakened.

As used herein, the term "inhibition of biofilm formation" refers to reducing the formation of structures produced by fungi, bacteria, or microorganisms as described above, or making the formation impossible. Such inhibition of biofilm formation includes not only inhibiting or killing the growth, proliferation of fungi, bacteria, or microorganisms, but also inhibiting the formation of a mixture adhering to the solid surface.

As used herein, the term "removing biofilm" refers to remove the already formed biofilm, wherein the biofilm is ultimately removed by inhibiting or killing the growth and proliferation of fungi, bacteria, or microorganisms present in the biofilm to separate or detach them from the biofilm. Preferably, the biofilm may be a biofilm formed by *Candida* species.

Further, the present disclosure provides a method of inhibiting fungi, including treating the fungi with the antifungal composition of the present disclosure.

In the treatment, the antifungal composition of the present disclosure is treated with bacteria, fungi, or harmful microorganisms at room temperature or a low temperature of 0 to 5° C., thereby sterilizing or killing the bacteria, fungi, or harmful microorganisms in a short time.

The composition comprising all of propylene glycol, caprylic acid, and carvacrol as active ingredients according to the present disclosure can effectively inhibit both fungi such as *Candida* species and the biofilm of the fungi in a short time at low temperature and room temperature with only a trace amount of treatment. Since all of the above active ingredients have human safety, the composition of the present disclosure can be used as a new antifungal agent having both excellent antifungal activity and safety that can replace conventional antifungal agents.

Hereinafter, the present disclosure will be described in more detail by the following examples.

Preparation Example and Experimental Method

1. Preparation of Fungi

*Candida albicans* (ATCC 10231, 18804, and 11006), a major causative agent of candidiasis, was prepared as a harmful fungus to be used in the experiment to confirm whether the composition of the present disclosure has antifungal activity. The three strains were obtained from American Type Culture Collection (ATCC) and Korea University Food Microbiology Culture Collection (Seoul, South Korea). Each strain was stored at −80° C. in sabouraud dextrose broth (SDB; Difco, Becton Dickinson, Sparks, MD, USA) stock culture solution containing 20% glycerol and subcultured monthly. Each strain was separately cultured using 3 mL SDB enrichment medium at 30° C. for 24 hours before use in experiments. Then, 100 uL each of 3 types of *Candida albicans* strains were dispensed into 10 mL SDB enrichment medium and cultured at 30° C. for 24 hours, and the cultured suspensions were centrifuged at 3,000×g for 15 minutes (Centra-CL2, Needham Heights, MA, USA). After discarding the supernatants, the precipitated strain pellet was washed three times using 0.85% sterile saline, and again the same amount of 0.85% sterile saline was added and homogenized, and then transferred into 50 mL plastic tube (Becton Diskinson, Franklin Lakes, NJ, USA) to prepare a mixed fungal solution of *Candida albicans*.

2. Formation of Biofilm

*Candida albicans* biofilms were formed on a stainless-steel coupon. Specifically, the biofilms were immersed in 90% (v/v) ethanol for 30 minutes for decontamination of stainless-steel coupons (1.5×1.0 cm2) and washed with sterile distilled water. Then, stainless-steel coupons were placed in a 12-well tissue culture plate containing 4.95 mL of SDB enrichment medium, and 50 uL of the mixed suspensions of *albicans* were dispensed and cultured at 30° C. for 48 hours to form *Candida albicans* biofilms. After forming the biofilm on each coupon, weakly attached cells, not the biofilm, were separated using 0.85% sterile physiological saline.

3. Preparation of Agents

Propylene glycol (PG) and laurocapram (LCM), which are penetration enhancers, were purchased from Sigma Chemical Co. (St. Louis, MO, USA). Caprylic acid (CA) and Carvacrol (CAR) were also purchased from Sigma Chemical Co.

4. Antifungal Activity Analysis of Mixed Solutions of Different Penetration Enhancers with Caprylic Acid and Carvacrol Penetration enhancer stock solutions (PG and LCM; 20, 40, 60, 80, 100, and 120 mM), caprylic acid stock solutions (120 mM), and carvacrol stock solutions (120 mM) were prepared using 98% ethanol. Principally, caprylic acid and carvacrol stock solutions were added to a sterile glass tube (final CA concentration: 1.2 mM, final CAR concentration: 1.2 mM) and 9.7 mL of sterile 0.85% saline was added. For comparison of the efficacy of antifungal activity according to the type of penetration enhancer, 0.1 mL of the penetration enhancer stock solution was added to each sterile tube (final PG and LCM concentration: 0.2, 0.4, 0.6, 0.8, 1.0, or 1.2 mM). Antifungal solutions containing different penetration enhancers were equilibrated at 5° C. for 20 minutes in a 100 rpm shaking water tank (VS-1205SW1, Vision science Co. Ltd., Daejeon, South Korea), and then *Candida albicans* embedded biofilm coupons were added. At this time, the initial fungal population of *Candida albicans* was 6 log CFU/cm$^2$. All experiments were repeated three times.

5. Antifungal Activity Analysis of Mixed Solutions of Propylene Glycol, Caprylic Acid, and Carvacrol Propylene glycol (PE) stock solutions (60 and 120 mM), caprylic acid (CA) stock solutions (60 and 120 mM), and carvacrol (CAR) stock solutions (60 and 120 mM) were prepared using 98% ethanol. 0.1 mL of each of these stock solutions was added to a sterile glass tube, and 9.9 mL of 0.85% physiological saline was added so that the final concentrations of each of propylene glycol, caprylic acid, and carvacrol were 0.6 or 1.2 mM.

Then, antimicrobial mixtures of 0.6 or 1.2 mM of propylene glycol, caprylic acid, or carvacrol alone, or different combinations including the two or all of the three were prepared. At this time, the total volume was 10 mL using 0.85% physiological saline. Then, the antimicrobial mixtures were equilibrated while stirring at a speed of 100 rpm for 30 minutes at a temperature of 5° C. or 22° C. Then, the antifungal activity of the antimicrobial mixtures was analyzed by adding a biofilm coupon in which *Candida albicans* was embedded, and all experiments were repeated six times.

6. Microbiological Analysis

Biofilm coupons were added to 10 mL of Dey/Engley neutralization buffer (Difco) to neutralize the antimicrobial agents. The biofilms were separated from the surface of stainless-steel coupons using a modified glass bead method (Tracho and Frank 2002). The stainless-steel coupons were added to 0.85% saline containing 1 g of sterile glass beads (425-600 µm, G8772; Sigma Aldrich Co., Llc.) after neutralization and stirred for 1 min using a vortex mixer (KMC-1300 V). Then, floating cells were collected and serially diluted 10-fold in 0.85% saline. Then, 100 µL of the diluent was spread onto sabouraud dextrose agar (SDA), and incubated at 30° C. for 48 hours. When complete inactivation of the culture was confirmed, it was transferred to 30 mL of SDB enrichment medium and incubated at 30° C. for 48 hours to recover damaged cells.

7. Confocal Laser Scanning Microscopy Analysis

The antifungal activity of the antimicrobial mixture of the present disclosure was confirmed through confocal laser scanning microscopy analysis. For the biofilms of *Candida* species treated with each antimicrobial mixture, intact cells were stained with green fluorescent SYTO®9 (S-34854, Molecular Probes™, Thermo Fisher Scientific Inc., Pittsburgh, PA, USA; final concentration: 6.7 µM; excitation: 488 nm, emission: 498/501 nm), and damaged cells were detected by staining with red fluorescent propidium iodide (PI; P3566, Molecular Probes™; final concentration: 15 µM; excitation: 555 nm, emission: 617 nm). After staining in a dark room at 30° C. for 30 minutes, Z-stack images were obtained by inverted CLSM (LSM 700; Carl Zeiss Microscopy GmbH, Jena, Germany) controlled by ZEN software (Carl Zeiss Microscopy GmbH).

Example 1

Antifungal Activity of Antifungal Composition by Different Penetration Enhancers To determine the difference in antifungal activity of different penetration enhancers of propylene glycol (PG) and laurocapram (LCM), 1.2 mM caprylic acid and 1.2 mM carvacrol were added at each concentration (0, 0.2, 0.4, 0.6, 0.8, 1.0, and 1.2 mM) and mixed with the different penetration enhancers to prepare antifungal compositions. The compositions were treated on *Candida albicans* biofilms, and the inhibitory activity of the biofilms was analyzed. At this time, the biofilm inhibition activity of the antifungal composition was performed at a low temperature of 5° C. and a room temperature of 22° C. for 5 minutes.

As a result, as shown in FIG. 1, we have found that the group using propylene glycol as a penetration enhancer had a better biofilm inhibitory effect than the group using laurocapram. In particular, the antifungal composition in which 1.2 mM caprylic acid, 1.2 mM carvacrol, and 1.2 mM propylene glycol were mixed was shown to have the best anti-biofilm activity compared to the composition of other combinations, and we have found that the *Candida albicans* biofilm was completely killed within 5 minutes at both low temperature 5° C. and room temperature 22° C. (reduced by more than 6.6 log).

Example 2

Preparation of Antifungal Composition Including Propylene Glycol, Caprylic Acid, and Carvacrol As it was confirmed that the use of propylene glycol as a penetration enhancer exhibits the most excellent antifungal activity through the results of Example 1, the present inventors prepared antifungal compositions of different combinations as shown in Table 1 below for propylene glycol, caprylic acid, and carvacrol.

Combinations of Antifungal Compositions

TABLE 1

Combinations of antibacterial compositions

| Experimental group | Propylene glycol (mM) | Caprylic acid (mM) | Carvacrol (mM) | Treatment time (min.) |
|---|---|---|---|---|
| Comparative Example 1 | 0.6 | — | — | 5 |
| Comparative Example 2 | 1.2 | — | — | 5 |
| Comparative Example 3 | — | 0.6 | — | 5 |
| Comparative Example 4 | — | 1.2 | — | 5 |
| Comparative Example 5 | — | — | 0.6 | 5 |
| Comparative Example 6 | — | — | 1.2 | 5 |
| Preparation Example 1 | 0.6 | 0.6 | — | 5 |
| Preparation Example 2 | 0.6 | 1.2 | — | 5 |
| Preparation Example 3 | 1.2 | 0.6 | — | 5 |
| Preparation Example 4 | 1.2 | 1.2 | — | 5 |
| Preparation Example 5 | — | 0.6 | 0.6 | 5 |
| Preparation Example 6 | — | 0.6 | 1.2 | 5 |
| Preparation Example 7 | — | 1.2 | 0.6 | 5 |
| Preparation Example 8 | — | 1.2 | 1.2 | 5 |
| Preparation Example 9 | 0.6 | — | 0.6 | 5 |
| Preparation Example 10 | 0.6 | — | 1.2 | 5 |
| Preparation Example 11 | 1.2 | — | 0.6 | 5 |
| Preparation Example 12 | 1.2 | — | 1.2 | 5 |
| Preparation Example 13 | 0.6 | 0.6 | 0.6 | 5 |
| Preparation Example 14 | 0.6 | 1.2 | 0.6 | 5 |
| Preparation Example 15 | 0.6 | 0.6 | 1.2 | 5 |
| Preparation Example 16 | 0.6 | 1.2 | 1.2 | 5 |
| Preparation Example 17 | 1.2 | 0.6 | 0.6 | 5 |
| Preparation Example 18 | 1.2 | 1.2 | 0.6 | 5 |
| Preparation Example 19 | 1.2 | 0.6 | 1.2 | 5 |
| Preparation Example 20 | 1.2 | 1.2 | 1.2 | 5 |

Example 3

Antifungal Activity of Antifungal Composition at Low Temperature

In order to analyze the antifungal activity of the antifungal composition for each experimental group of Example 2, after the antifungal composition was treated for 5 minutes on *Candida albicans* biofilms attached to stainless steel coupons while maintaining the temperature of 5° C., the inhibitory activity against the *Candida albicans* biofilms was assayed.

Figure 2:
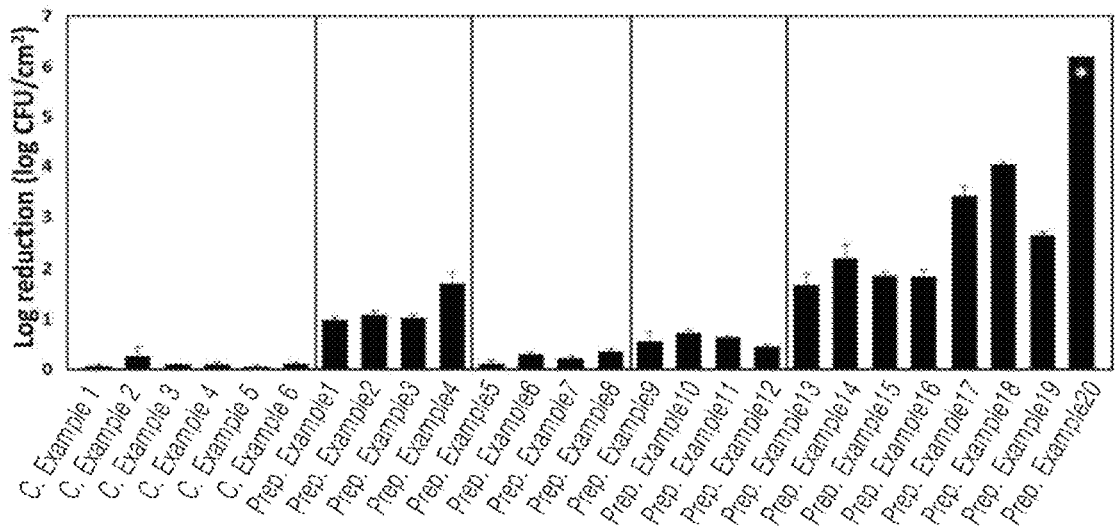
FIG. 2 shows antifungal activity against *Candida albicans* at a low temperature (e.g., 5° C.) for a composition comprising one of propylene glycol, caprylic acid, or carvacrol, a composition comprising the two in combination, and a composition comprising all three in combination.

As a result, as shown in FIG. 2, each of the compositions comprising propylene glycol, caprylic acid, or carvacrol alone (Comparative Examples 1 to 6) was shown to have an inhibitory activity on *Candida albicans* biofilms up to less than 0.50 log $CFU/cm^2$. In addition, the compositions comprising two of the three components showed high antifungal activity compared to the comparative examples, but showed a relatively low level of inhibitory activity (less than 1.0 log $CFU/cm^2$) (Preparation Examples 5 to 8 and Preparation Examples 9 to 12). On the other hand, the compositions comprising all of propylene glycol, caprylic acid, and carvacrol were found to have higher antifungal activity than the composition comprising alone and the composition comprising the two of them. In particular, the composition comprising 1.2 mM propylene glycol, 1.2 mM caprylic acid, and 1.2 mM carvacrol (Preparation Example 20) was found to have the best anti-biofilm activity, which showed a reduction effect of 6 log or more (99.9999% sterilization; about 6.19 log sterilization), and the inoculated *Candida albicans* biofilm was controlled to a level that was almost impossible to regenerate.

Example 4

Antifungal Activity of Antifungal Composition at Room Temperature

Example 4 was performed in the same manner as in Example 3, except that the antifungal activity was assayed at room temperature (22° C.) instead of 5° C.

Figure 3:
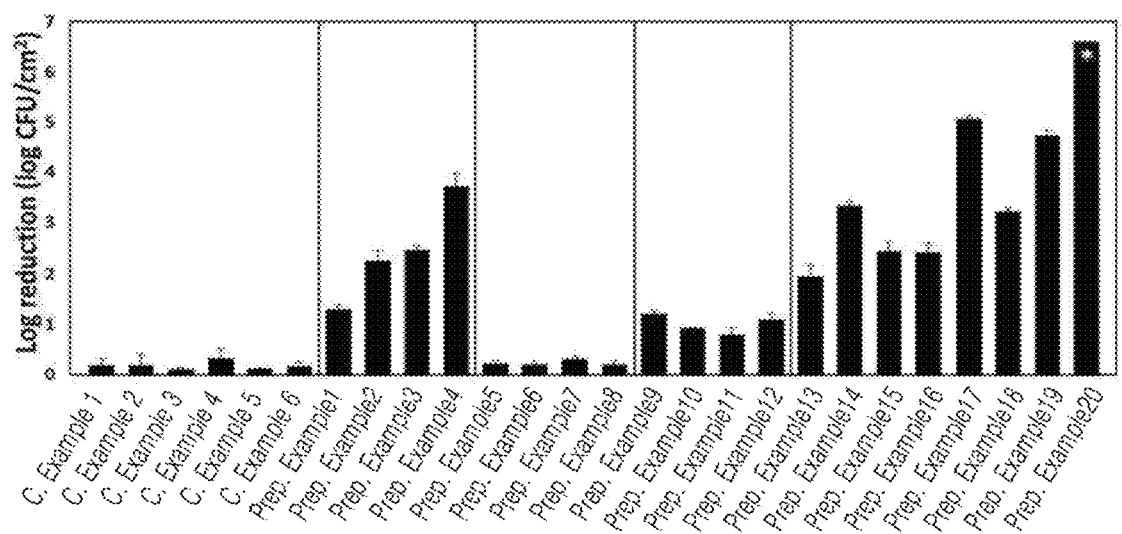
FIG. 3 shows antifungal activity against *Candida albicans* at an ambient temperature (e.g., 22° C.) for a composition comprising one of propylene glycol, caprylic acid, or carvacrol, a composition comprising the two in combination, and a composition comprising all three in combination.
Figure 4A:
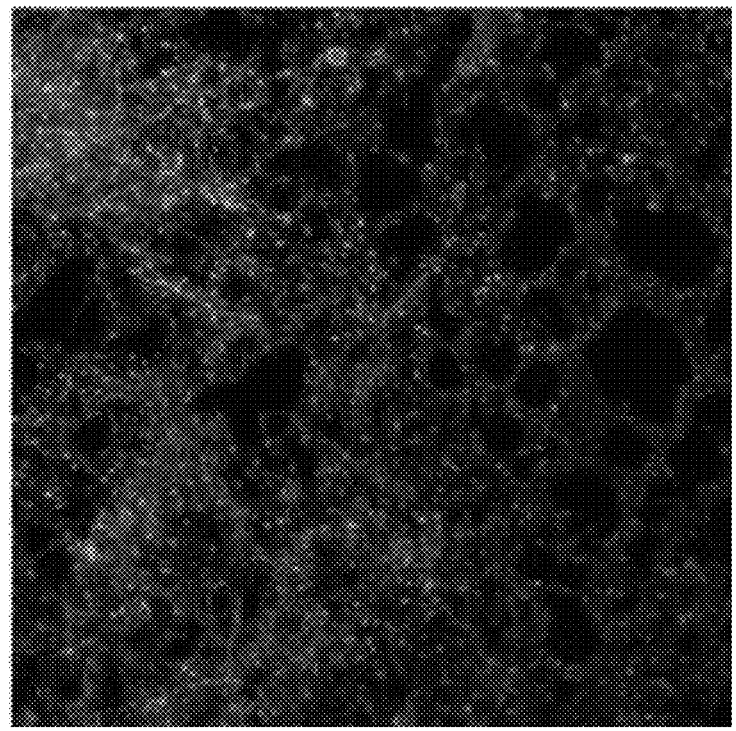
FIGS. 4A to 4F and 5A to 5F are photographs analyzed by confocal microscopy of *Candida albicans* biofilm formation inhibitory activity of the antifungal composition comprising propylene glycol, caprylic acid, and carvacrol of the present disclosure.
Figure 4B:
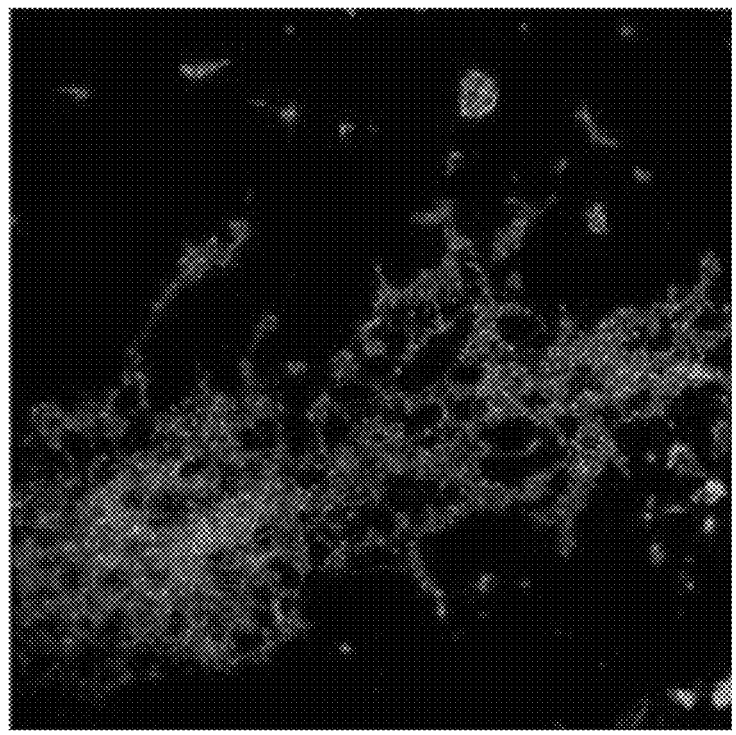
Figure 4C:
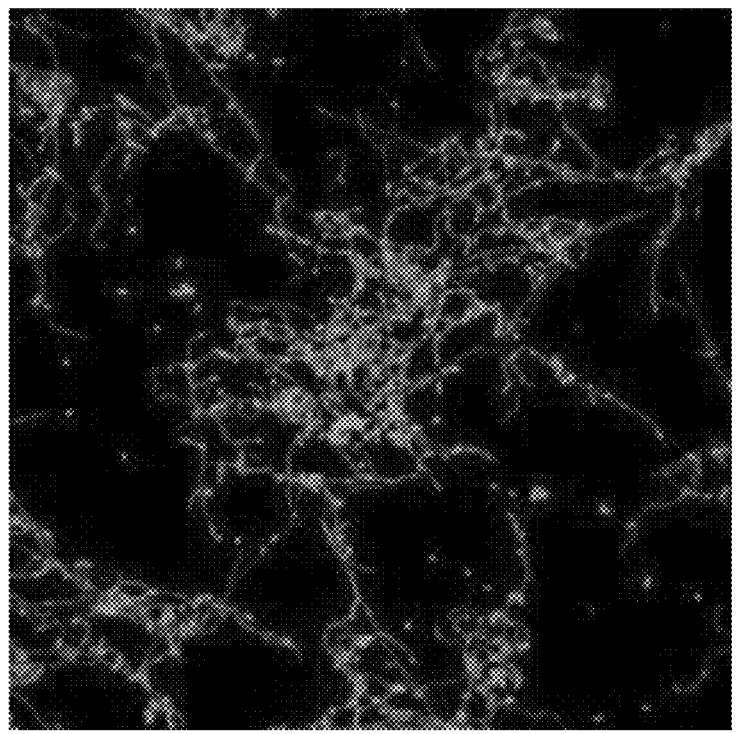
Figure 4D:
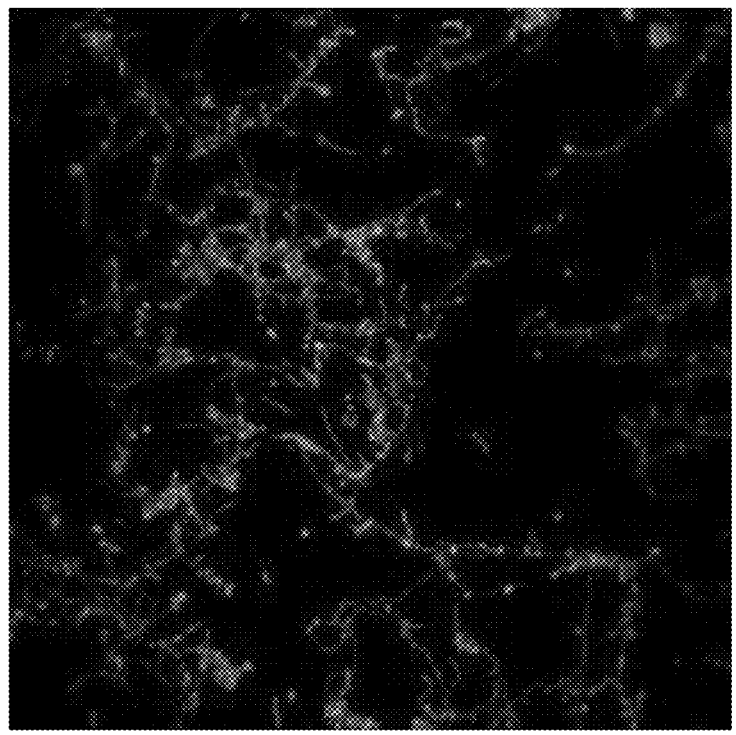
Figure 4E:
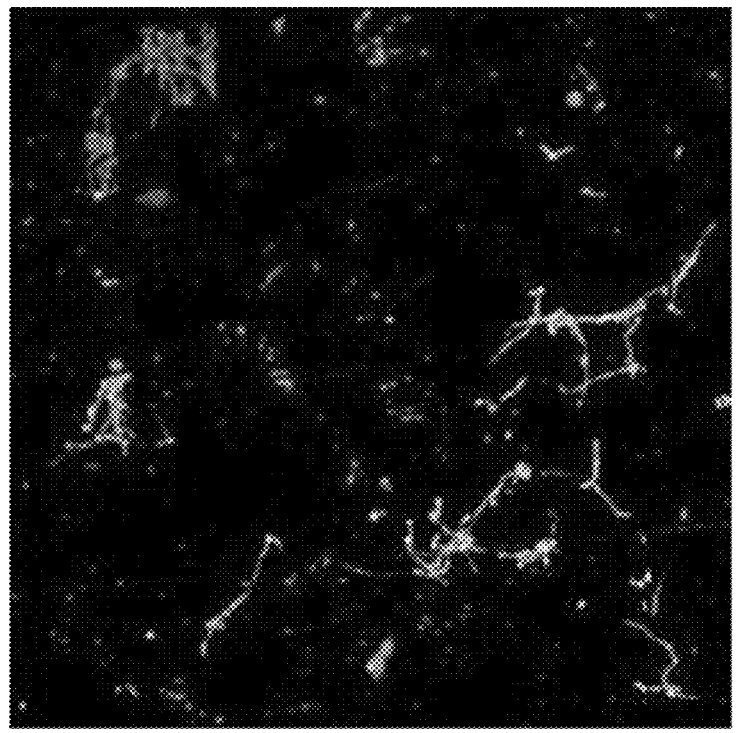
Figure 4F:
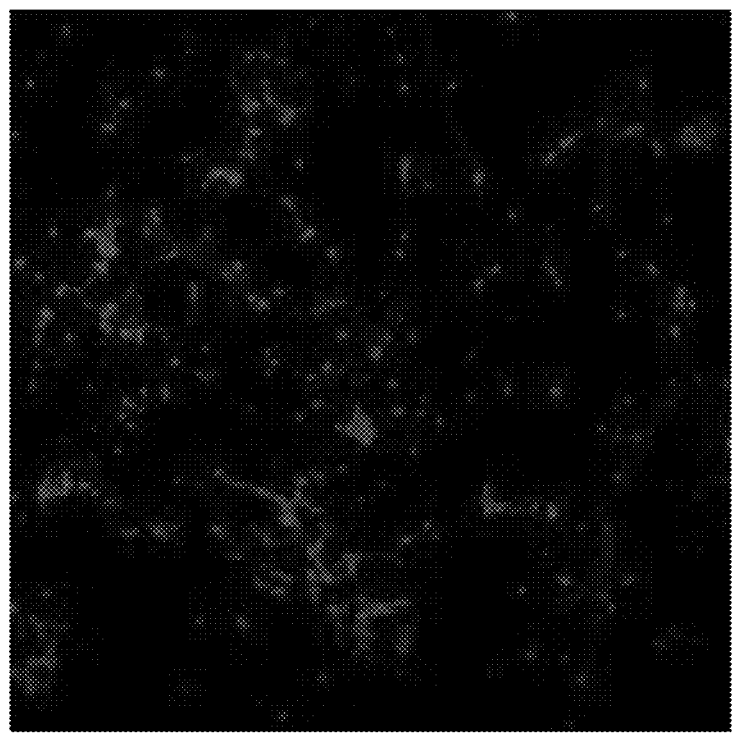
Figure 5A:
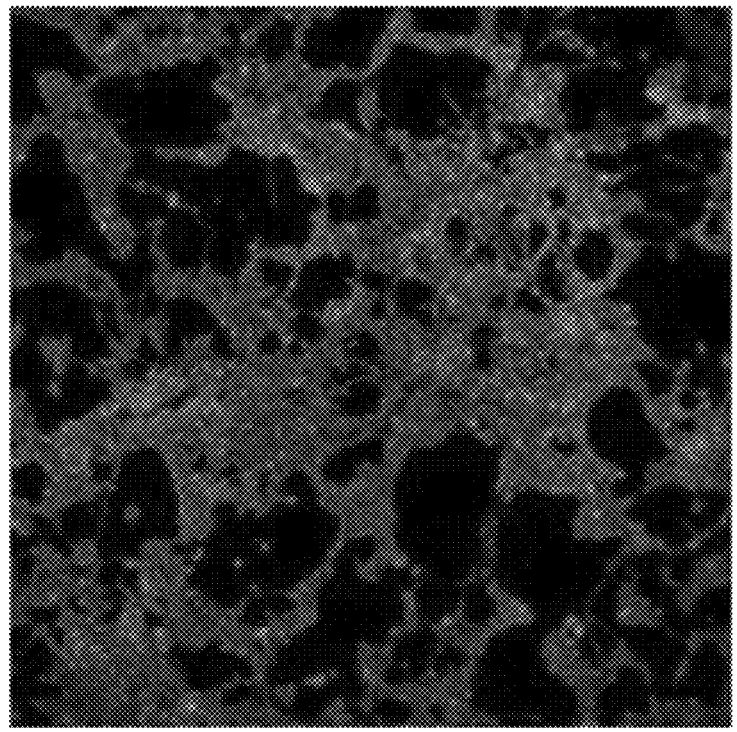
Figure 5B:
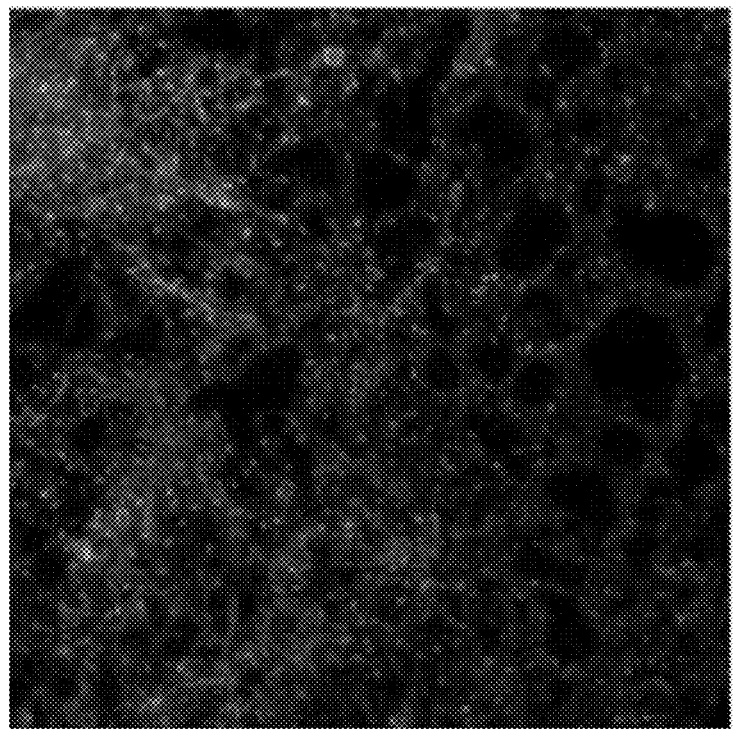
Figure 5C:
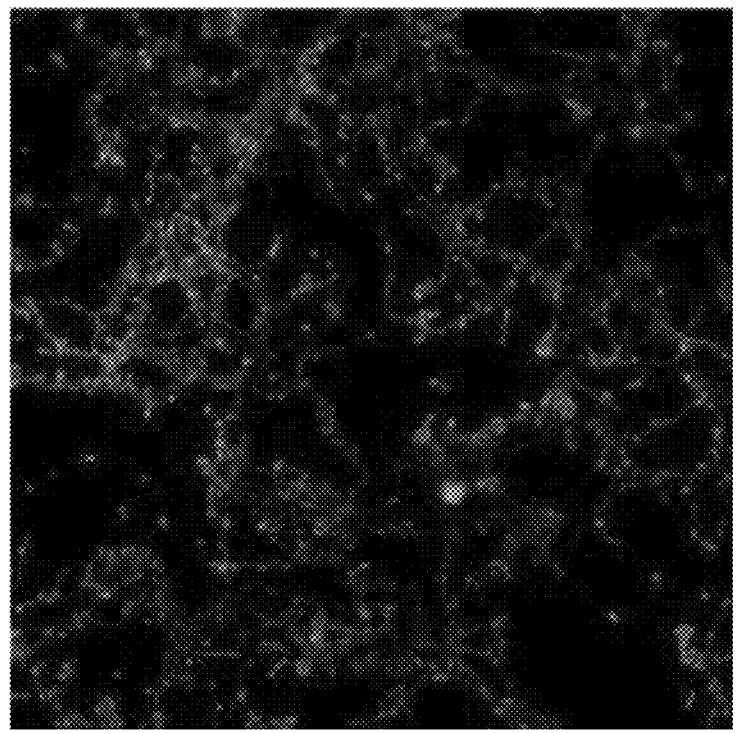
Figure 5D:
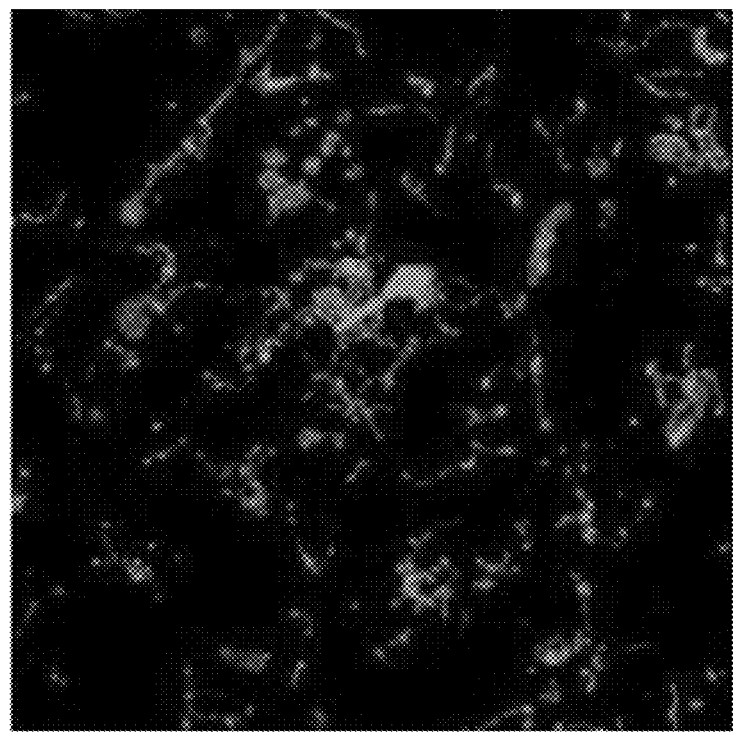
Figure 5E:
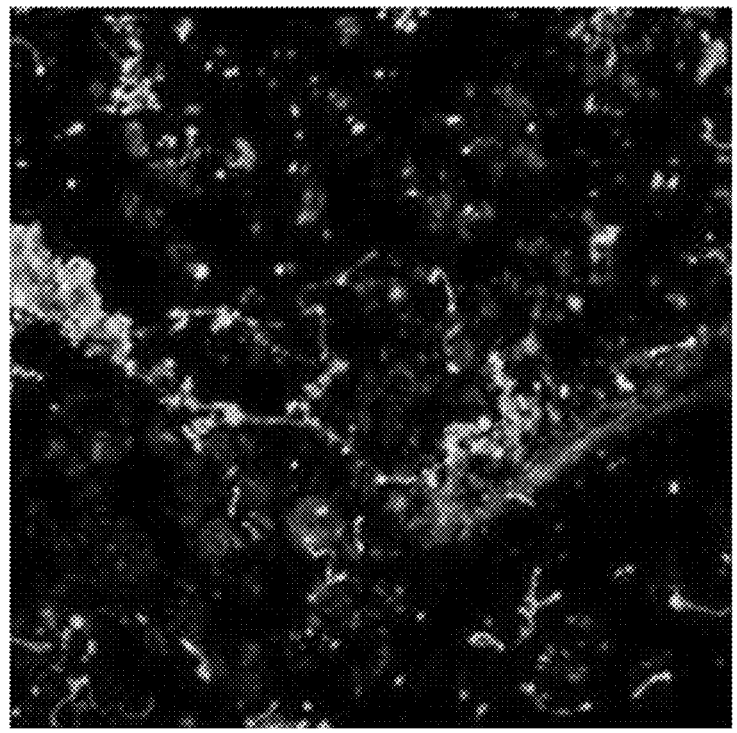
Figure 5F:
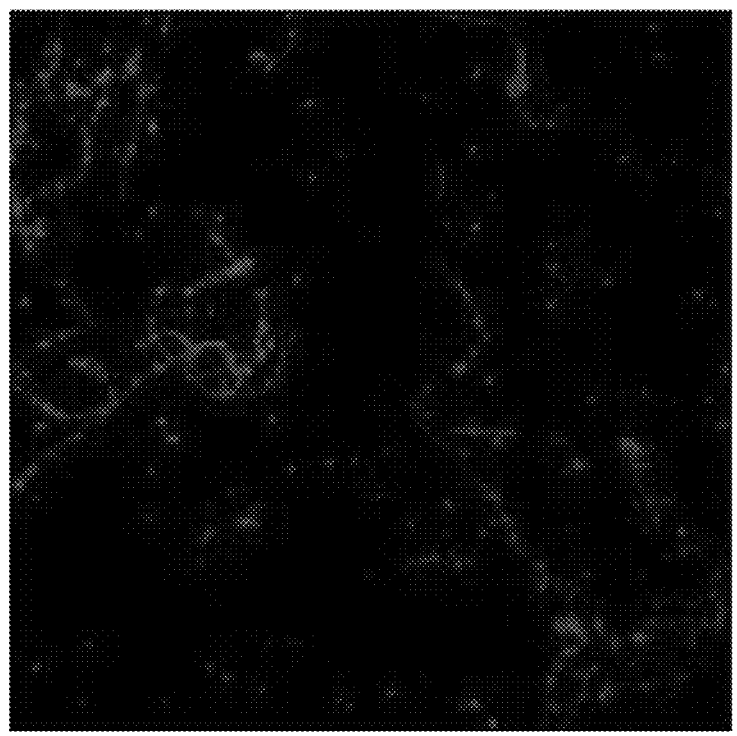

As a result of the analysis, as shown in FIG. 3, antifungal composition including all three components showed better antifungal activity compared to the antifungal composition including propylene glycol, caprylic acid, and carvacrol alone (Comparative Examples 1 to 6) and the antifungal composition including the two components (Preparation Examples 1 to 12). In addition, the antifungal composition of Preparation Examples 17 and 19 showed a reducing effect against *Candida albicans* of 4.5 log or more (4.74 to 5.07 log sterilization). The antifungal composition of Preparation Example 20 including 1.2 mM propylene glycol, 1.2 mM caprylic acid, and 1.2 mM carvacrol has a reducing effect against *Candida albicans* of 6.5 log or more (99.9999% sterilization; about 6.60 log sterilization). The inoculated *Candida albicans* biofilms were controlled to a level that was almost impossible to regenerate.

Example 5

Biofilm Inhibitory Activity for the Antifungal Composition of the Present Disclosure Through Confocal Laser Microscopy Analysis Furthermore, the present inventors performed the following experiment to confirm whether the antifungal composition of the present disclosure has substantially biofilm inhibitory activity. After forming *Candida albicans* biofilms on stainless steel, the antifungal composition of the present disclosure was treated onto *Candida albicans* biofilms while maintaining at room temperature (22° C.) and low temperature (5° C.) for 5 minutes. Then, the inhibitory activity of the biofilms was analyzed using a confocal laser scanning microscope. *Candida albicans* cells present in the biofilms were stained with SYTO® 9 (green) and PI (red) to check the degree of cell viability and damage. Here, green staining indicates viable cells, while yellow, orange, or red staining indicates damaged cells.

As a result, as shown in FIGS. 4A to 4F and 5A to 5F, groups untreated (4A and 5A), groups treated with propylene glycol (1.2 mM) alone (4B and 5B), groups treated with propylene glycol, and caprylic acid (4C and 5C), and groups treated with propylene glycol and carvacrol (4D and 5D) did not show significant damage to the fungal cell membrane in the biofilms at 5° C. and 22° C., whereas in groups treated with caprylic acid and carvacrol together (4E and 5E), yellow and orange fluorescence signals were detected, indicating that the fungal cell membrane was damaged in the biofilms. In particular, groups treated with propylene glycol, caprylic acid, and carvacrol all together (4F and 5F) showed that most cells emitted a strong red fluorescence signal, while emitting little or no green fluorescence, compared to all other experimental groups, indicating that it effectively killed the fungi forming the biofilms.

The anti-biofilm effect for the composition of the present disclosure was found to appear at almost the same level not only at room temperature but also at a low temperature of 5° C.

Through the above results, the antifungal composition of the present disclosure including all of propylene glycol, caprylic acid, and carvacrol has high antifungal activity against *Candida albicans* biofilms within 5 minutes not only at room temperature but also at a low temperature of 5° C., and has excellent inhibitory or removal activity of biofilm formation.

Therefore, we have confirmed that the composition comprising propylene glycol, caprylic acid, and carvacrol according to the present disclosure can be effectively used as an antifungal agent against harmful fungi including *Candida albicans*.

As described above, although the Examples have been described with reference to the limited embodiments and drawings, various modifications and variations are possible from the above description by those skilled in the art. For example, even if the present disclosure is performed in an order different from the described method, and/or the described components are mixed or combined in a different form from the described method, or replaced or substituted by other components or equivalents. Appropriate results can be achieved.

The invention claimed is:

1. A method of inhibiting fungi comprising:
preparing an antifungal composition comprising propylene glycol, caprylic acid, and carvacrol as active ingredients; and
contacting the fungi with the antifungal composition at a low temperature of 0 to 5° C. for 5 minutes,
wherein the antifungal composition comprises the propylene glycol, the caprylic acid, and the carvacrol at a concentration of 1.2 mM, respectively, and
wherein the fungi are *Candida albicans*.

2. A method of inhibiting or removing a fungal biofilm formation comprising:
preparing an antifungal composition comprising propylene glycol, caprylic acid, and carvacrol as active ingredients; and
contacting the fungal biofilm with the antifungal composition at a low temperature of 0 to 5° C. for 5 minutes,
wherein the antifungal composition comprises the propylene glycol, the caprylic acid, and the carvacrol at a concentration of 1.2 mM, respectively, and
wherein the fungi are *Candida albicans*.

* * * * *